(12) United States Patent
Heo et al.

(10) Patent No.: US 12,292,509 B2
(45) Date of Patent: May 6, 2025

(54) METHOD AND SYSTEM FOR CLASSIFYING OBJECTS AROUND VEHICLE

(71) Applicants: Hyundai Motor Company, Seoul (KR); Kia Corporation, Seoul (KR); Kookmin Univeristy Industry Academy Cooperation Foundation, Seoul (KR)

(72) Inventors: Se Jong Heo, Sejong-si (KR); Kyung Jae Ahn, Seongnam-si (KR); Yun Jung Kim, Siheung-si (KR); Yeon Sik Kang, Seoul (KR); Ju Yeon Cho, Yangju-si (KR)

(73) Assignees: Hyundai Motor Company, Seoul (KR); Kia Corporation, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 395 days.

(21) Appl. No.: 17/872,113

(22) Filed: Jul. 25, 2022

(65) Prior Publication Data
US 2023/0288568 A1    Sep. 14, 2023

(30) Foreign Application Priority Data

Mar. 8, 2022    (KR) ........................ 10-2022-0029523

(51) Int. Cl.
*G01S 17/931*    (2020.01)
*G01S 17/06*    (2006.01)
(Continued)

(52) U.S. Cl.
CPC ............. *G01S 17/931* (2020.01); *G01S 17/06* (2013.01); *G01S 17/58* (2013.01); *G01S 17/89* (2013.01)

(58) Field of Classification Search
CPC ........ G01S 17/931; G01S 17/06; G01S 17/58; G01S 17/89; G01S 7/4802; G01S 7/4808;
(Continued)

(56) References Cited

U.S. PATENT DOCUMENTS 9,454,819 B1    9/2016    Seetharaman et al.
11,188,082 B2 *    11/2021    Silva .................... G05D 1/0257
(Continued)

FOREIGN PATENT DOCUMENTS

KR    101427186 B1    8/2014
KR    20180059188 A    6/2018
(Continued)

*Primary Examiner* — Charlotte M Baker
(74) *Attorney, Agent, or Firm* — Slater Matsil, LLP

(57) ABSTRACT

An embodiment method for classifying objects around a vehicle includes generating a dynamic occupancy grid map including a plurality of cells including point data corresponding to each of a plurality of objects located around the vehicle and velocity vector information of the point data, based on LiDAR data received from a LiDAR sensor of the vehicle and information related to movement of the vehicle, determining a cluster corresponding to each of the plurality of objects on the dynamic occupancy grid map using a clustering technique, and classifying an object corresponding to the cluster into a static object or a dynamic object, based on a region size of the cluster and velocity vector information included in cells belonging to the cluster.

20 Claims, 12 Drawing Sheets

(51) Int. Cl.
*G01S 17/58* (2006.01)
*G01S 17/89* (2020.01)

(58) Field of Classification Search
CPC . G01S 17/86; B60W 40/02; B60W 2420/408; B60W 2554/20; B60W 2554/40; G06T 7/11; G06T 2207/10028
USPC ......................................................... 382/103
See application file for complete search history.

(56) References Cited

U.S. PATENT DOCUMENTS

| | | |
|---|---|---|
| 2021/0080571 A1 | 3/2021 | Von Rosenberg et al. |
| 2021/0146540 A1 | 5/2021 | Kim et al. |

FOREIGN PATENT DOCUMENTS

| | | |
|---|---|---|
| KR | 20180112622 A | 10/2018 |
| KR | 20190134554 A | 12/2019 |
| KR | 20210025613 A | 3/2021 |

* cited by examiner

METHOD AND SYSTEM FOR CLASSIFYING OBJECTS AROUND VEHICLE

CROSS-REFERENCE TO RELATED APPLICATIONS

This application claims the benefit of Korean Patent Application No. 10-2022-0029523, filed on Mar. 8, 2022, which application is hereby incorporated herein by reference.

TECHNICAL FIELD

The present invention relates to a method and system for classifying objects around a vehicle.

BACKGROUND

In order to achieve safe autonomous driving of a vehicle, technology that can accurately recognize a surrounding environment, can determine a safe path, and can accurately control stability of the vehicle is required.

Particularly, in order to achieve autonomous driving of the vehicle, the vehicle can predict future paths of objects around the vehicle and avoid the future paths, and thus, requires accurate information about the states of the objects around the vehicle.

More particularly, in order to improve safety of the vehicle during autonomous driving of the vehicle, it is necessary to predict the future paths of dynamic objects, for example, vehicles and/or motorcycles, among the objects around the vehicle and to perform determinations to avoid collisions with the dynamic objects and, for this purpose, it is first necessary for the vehicle to classify the objects around the vehicle into static objects and/or dynamic objects.

Therefore, technology that classifies objects around a vehicle into static objects and/or dynamic objects based on the magnitudes of the relative velocities of the objects, acquired through the radar of the vehicle has been conventionally developed.

Further, technology that extracts a mask from a result acquired based on a camera and then classifies objects around a vehicle into static objects and/or dynamic objects using Gaussian Fusion has been conventionally developed.

Moreover, technology that classifies objects acquired through the radar of a vehicle into static objects using deep learning has been conventionally developed.

Furthermore, technology that confirms static objects from an image acquired using a camera using deep learning has been conventionally developed.

Moreover, technology that identifies dynamic obstacles, i.e., dynamic objects, based on a camera and LiDAR has been conventionally developed.

Further, technology that searches for objects, such as obstacles, based on LiDAR and radar and generates the moving path of an intelligent robot has been conventionally developed.

In addition, technology that detects a person based on a temperature sensor and the detected person as a dynamic object when objects are classified into static objects and/or dynamic objects has been conventionally developed.

Besides, development of algorithms to classify objects around a vehicle based on artificial intelligence is being actively researched now.

SUMMARY

Accordingly, embodiments of the present invention provide a method and system for classifying objects around a vehicle that substantially obviate one or more problems due to limitations and disadvantages of the related art.

An embodiment of the present invention provides a method and system for classifying objects around a vehicle which may effectively classify the objects around the vehicle into static objects and/or dynamic objects compared to the conventional technologies.

For example, the method and system for classifying the objects around the vehicle according to embodiments of the present invention may provide data processing technology which may effectively classify the objects around the vehicle into static objects and/or dynamic objects without requiring a lot of training data or a large amount of arithmetic operations, compared to classification algorithms based on artificial intelligence which is being actively researched recently.

Additional advantages, objects, and features of embodiments of the invention will be set forth in part in the description which follows and in part will become apparent to those having ordinary skill in the art upon examination of the following, or may be learned from practice of the invention. The objectives and other advantages of embodiments of the invention may be realized and attained by the structure particularly pointed out in the written description and claims hereof as well as the appended drawings.

In accordance with embodiments of the invention, a method for classifying objects around a vehicle includes generating a dynamic occupancy grid map including a plurality of cells including point data corresponding to each of a plurality of objects located around the vehicle and velocity vector information of the point data, based on LiDAR data received from LiDAR of the vehicle and information related to movement of the vehicle, determining a cluster corresponding to each of the plurality of objects on the dynamic occupancy grid map using a clustering technique, and classifying an object corresponding to the cluster into a static object or a dynamic object, based on a region size of the cluster and velocity vector information included in cells belonging to the cluster.

The generating the dynamic occupancy grid map may include generating an occupancy grid map including a plurality of grid cells including the point data corresponding to each of the plurality of objects, based on the LiDAR data, and generating the dynamic occupancy grid map by mapping the velocity vector information of the point data calculated based on the information related to movement of the vehicle to the occupancy grid map.

The velocity vector information may be calculated based on velocity information acquired based on past and present position information of the point data and elapsed time, and velocity information of the vehicle included in the information related to movement of the vehicle.

The method may further include assigning object identification information to the cluster corresponding to each of the plurality of objects.

The classifying the object corresponding to the cluster into the static object or the dynamic object may include determining, among the objects, a first object, configured such that a region size of the cluster corresponding to the first object is greater than a first predetermined threshold, as the static object, and determining, among the objects, a second object, configured such that a region size of the cluster corresponding to the second object is equal to or less than the first predetermined threshold, as the static object or the dynamic object based on velocity vector information included in cells corresponding to the second object.

The determining the second object as the static object or the dynamic object may include identifying whether or not a variance value of directions of velocity vectors is greater than a second predetermined threshold based on the velocity vector information included in the cells corresponding to the second object, determining the second object as the static object, when the variance value is greater than the second predetermined threshold, and determining the second object as the dynamic object, when the variance value is equal to or less than the second predetermined threshold.

The determining the clusters corresponding to each of the plurality of objects on the dynamic occupancy grid map may include determining, among respective point data within a predetermined range from arbitrary point data in the plurality of cells, second point data having a speed difference with arbitrary first point data, which is equal to or less than a predetermined threshold, as one cluster based on the velocity vector information.

In another embodiment of the present invention, a system for classifying objects around a vehicle includes an interface configured to receive LiDAR data from LiDAR of the vehicle, and a controller electrically connected to the interface, wherein the controller generates a dynamic occupancy grid map including a plurality of cells including point data corresponding to each of a plurality of objects located around the vehicle and velocity vector information of the point data, based on the received LiDAR data and information related to movement of the vehicle, determines a cluster corresponding to each of the plurality of objects on the dynamic occupancy grid map using a clustering technique, and classifies an object corresponding to the cluster into a static object or a dynamic object, based on a region size of the cluster and velocity vector information included in cells belonging to the cluster.

The controller may generate an occupancy grid map including a plurality of grid cells including the point data corresponding to each of the plurality of objects, based on the LiDAR data, and may generate the dynamic occupancy grid map by mapping the velocity vector information of the point data calculated based on the information related to movement of the vehicle to the occupancy grid map.

The velocity vector information may be calculated based on velocity information acquired based on past and present position information of the point data and elapsed time, and velocity information of the vehicle included in the information related to movement of the vehicle.

The controller may assign object identification information to the cluster corresponding to each of the plurality of objects.

The controller may determine, among the objects, a first object, configured such that a region size of the cluster corresponding to the first object is greater than a first predetermined threshold, as the static object, and may determine, among the objects, a second object, configured such that a region size of the cluster corresponding to the second object is equal to or less than the first predetermined threshold, as the static object or the dynamic object based on the velocity vector information included in cells corresponding to the second object.

The controller may identify whether or not a variance value of directions of velocity vectors is greater than a second predetermined threshold based on the velocity vector information included in the cells corresponding to the second object, may determine the second object as the static object, when the variance value is greater than the second predetermined threshold, and may determine the second object as the dynamic object, when the variance value is equal to or less than the second predetermined threshold.

The controller may determine the cluster corresponding to each of the plurality of objects on the dynamic occupancy grid map by determining, among respective point data within a predetermined range from arbitrary point data in the plurality of cells, second point data having a speed difference with arbitrary first point data, which is equal to or less than a predetermined threshold, as one cluster based on the velocity vector information.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

Reference will now be made in detail to embodiments of the present disclosure, examples of which are illustrated in the accompanying drawings. Wherever possible, the same reference numbers will be used throughout the drawings to refer to the same or like parts. All elements of the embodiments of the present invention are not described, and a description of content which is general in the art to which the present invention pertains or a description of redundant content among the embodiments will be omitted. As used herein, the terms "unit", "module" and "device" may be implemented as software or hardware, and a plurality of units, modules or devices may be implemented as one element or one unit, module or device may include a plurality of elements depending on embodiments.

In the following description of the embodiments, when an element or layer is referred to as being "connected to" or "coupled to" another element or layer, it may be directly connected or coupled to the other element or layer, or it may be indirectly connected or coupled to the other element or layer, and indirect connection may encompass connection through a wireless communication network.

Further, the term "comprising" is inclusive and therefore specifies the presence of stated features, integers, steps, operations, elements, components, and/or combinations thereof, but does not preclude the presence or addition of one or more other features, integers, steps, operations, elements, components, and/or combinations thereof.

In the following description of the embodiments, terms, such as "first" and "second", are used only to distinguish one element from other elements, and these elements should not be construed as being limited by these terms.

As used herein, singular forms may be intended to include plural forms as well, unless the context clearly indicates otherwise.

Identification marks in respective operations are used only for convenience of explanation, and do not imply a sequence or order of the operations, and the respective operations may be executed unlike the stated order, unless the context clearly indicates a specific order of the respective operations.

Hereinafter, the operational principle and the embodiments of the present invention will be described with reference to the accompanying drawings.

Figure 1:
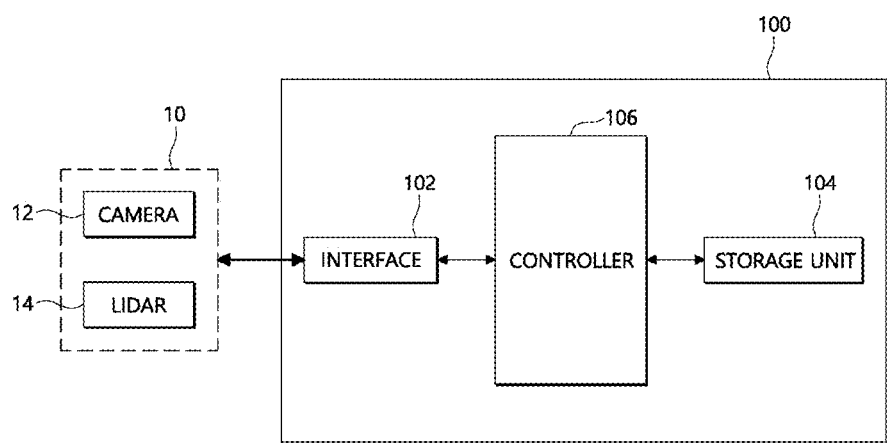
FIG. 1 is a block diagram showing the configuration of a system for classifying objects around a vehicle according to one embodiment of the present invention.

FIG. 1 is a block diagram showing the configuration of a system for classifying objects around a vehicle according to one embodiment of the present invention.

Referring to FIG. 1, a system 100 for classifying objects around a vehicle 1 may include an interface 102, a storage unit 104 and/or a controller 106.

The interface 102 may transmit commands input from other external devices or by a user to other elements of the system 100, or may output commands or data received from other elements of the system 100 to other external devices or the user.

For example, other external devices may include a sensor unit 10 of the vehicle.

The sensor unit 10 may acquire sensor data corresponding to surrounding information of the vehicle 1, and may include at least one camera 12 and/or at least one LiDAR 14.

Here, one camera 12 or a plurality of cameras 12 may be provided, and may be mounted inside and/or outside the main body of the vehicle 1 so as to acquire image data.

Further, one LiDAR 14 or a plurality of LiDARs 14 may be provided, and may generate LiDAR data by radiating laser pulses towards the surroundings of the vehicle 1.

The storage unit 104 may store various data used by at least one element of the system 100, for example, input data and/or output data regarding software programs and commands related thereto.

The storage unit 104 may be implemented by at least one of non-volatile memories, such as a cache, a Read Only Memory (ROM), a Programmable ROM (PROM), an Erasable Programmable ROM (EPROM), an Electrically Erasable Programmable ROM (EEPROM) and/or a flash memory, volatile memories, such as a Random Access Memory (RAM), or storage media, such as a Hard Disk Drive (HDD) and/or a CD-ROM, without being limited thereto.

The controller 106 (referred to as a control circuit or a processor) may control at least one of other elements (for example, hardware elements (for example, the interface 102 and/or the storage unit 104) and/or software elements (software programs) of the system 100, and may perform various data processing and operations. The controller 106 may include a processor and a memory.

According to one embodiment, the controller 106 may receive the sensor data from the sensor unit 10 of the vehicle 1 through the interface 102.

For example, the sensor data may include image data received from the camera 12 of the vehicle 1 and/or LiDAR data received from the LiDAR 14 of the vehicle 1.

The controller 106 may confirm information related to movement of the vehicle 1.

For example, information related to movement of the vehicle 1 may include the velocity of the vehicle 1 and/or the yaw rate of the vehicle 1.

The controller 106 may generate a dynamic occupancy grid map (DOGM) based on the sensor data and the information related to movement of the vehicle 1.

The dynamic occupancy grid map may include a plurality of cells including point data corresponding respectively to a plurality of objects located around the vehicle 1, and velocity vector information of the point data.

Further, the controller 106 may determine clusters corresponding respectively to the plurality of objects by clustering cells corresponding to each of the plurality of objects on the dynamic occupancy grid map using a clustering technique. Accordingly, the respective objects may be distinguished from one another on the dynamic occupancy grid map.

For example, the clustering technique may include a density-based clustering technique, for example, a Density-Based Spatial Clustering of Applications with Noise (DBSCAN) algorithm. The DBSCAN algorithm is an algorithm which classifies clusters based on densities of spaces in which data is located.

Further, the controller 106 may classify the objects corresponding to the clusters into static objects and/or dynamic objects, based on the region sizes of the respective clusters and velocity vector information included in cells belonging to the respective clusters on the dynamic occupancy grid map.

For example, the static objects may include buildings, traffic lights, road signs and/or temporary structures. Further, the dynamic objects may include vehicles, motorcycles, bicycles and/or people.

The embodiments of detailed operation of the system 100 under the control of the controller 106 will be described with reference to the following drawings.

Figure 2:
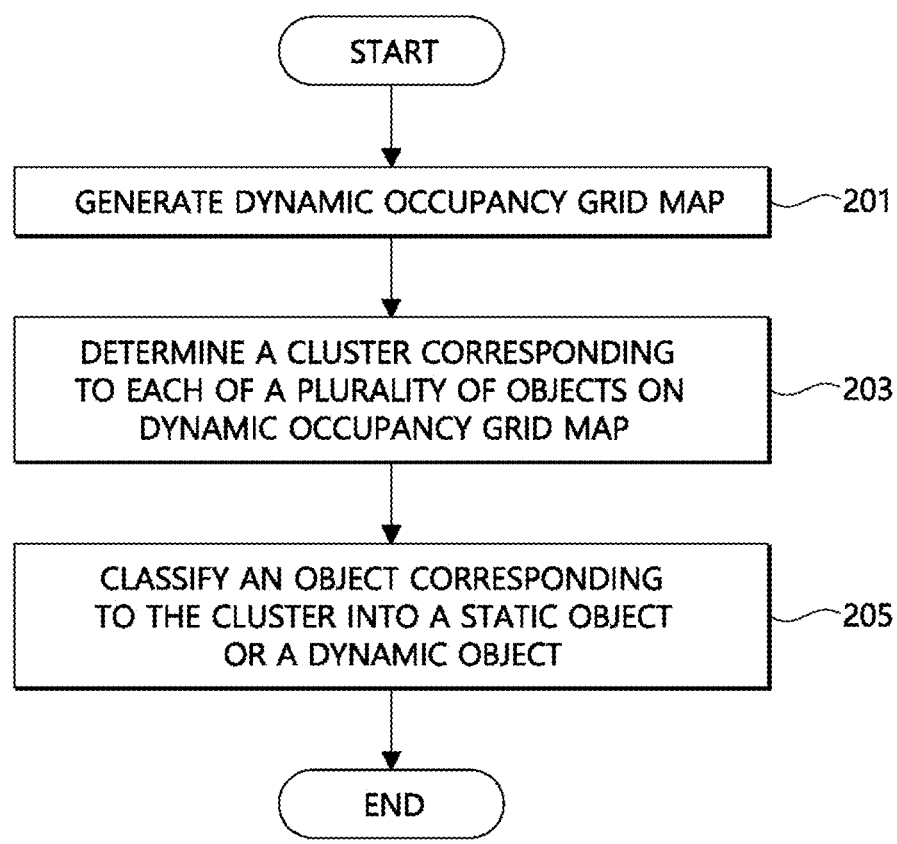
FIG. 2 is a flowchart representing operation of the system according to one embodiment of the present invention.

FIG. 2 is a flowchart representing operation of the system 100 (and/or the controller 106 of the system 100) according to one embodiment of the present invention.

Referring to FIG. 2 the system 100 may generate a dynamic occupancy grid map based on LiDAR data received from the LiDAR 14 of the vehicle 1 and information related to movement of the vehicle 1 (201).

For example, the system 100 may generate the dynamic occupancy grid map including a plurality of grid cells including point data corresponding respectively to a plurality of objects based on the LiDAR data.

Further, the system 100 may generate the dynamic occupancy grid map by mapping velocity vector information of the point data, calculated based on the information related to movement of the vehicle 1, to the occupancy grid map. For example, the velocity vector information may be calculated based on velocity information acquired based on past and present position information of the point data and elapsed time, and velocity information of the vehicle 1 included in the information related to movement of the vehicle 1.

The system 100 may determine a cluster corresponding to each of the plurality of objects on the dynamic occupancy grid map using the clustering technique (203).

The system 100 may determine the clusters corresponding respectively to the plurality of objects, through a method in which, among respective point data within a predetermined range from arbitrary point data in a plurality of cells, second point data having a speed difference with arbitrary first point data, which is equal to or less than a predetermined threshold, is determined as one cluster, based on the velocity vector information of the respective cells of the dynamic occupancy grid map.

The system 100 may classify an object corresponding to the cluster into a static object or a dynamic object based on a region size of the cluster and velocity vector information included in cells belonging to the cluster (205).

The system 100 may determine an object having the region size of a corresponding cluster which is greater than a first predetermined threshold (referred to as a first object) as a static object.

The system 100 may determine an object having the region size of a corresponding cluster which is equal to or less than the first predetermined threshold (referred to as a second object) as a static object or a dynamic object based on velocity vector information included in corresponding cells.

The system 100 may determine a second object as a static object or a dynamic object by confirming whether or not a variance value of directions of velocity vectors based on velocity vector information included in cells corresponding to the second object is greater than a second predetermined threshold.

For example, the system 100 may determine a second object as a static object when a variance value of cells corresponding to the second object is greater than the second predetermined threshold, and determine the second object as a dynamic object when the variance value of the cells corresponding to the second object is equal to or less than the second predetermined threshold.

In addition, in the above-described embodiment shown in FIG. 2, the system 100 may assign object identification information to each of the determined clusters.

Figure 3:
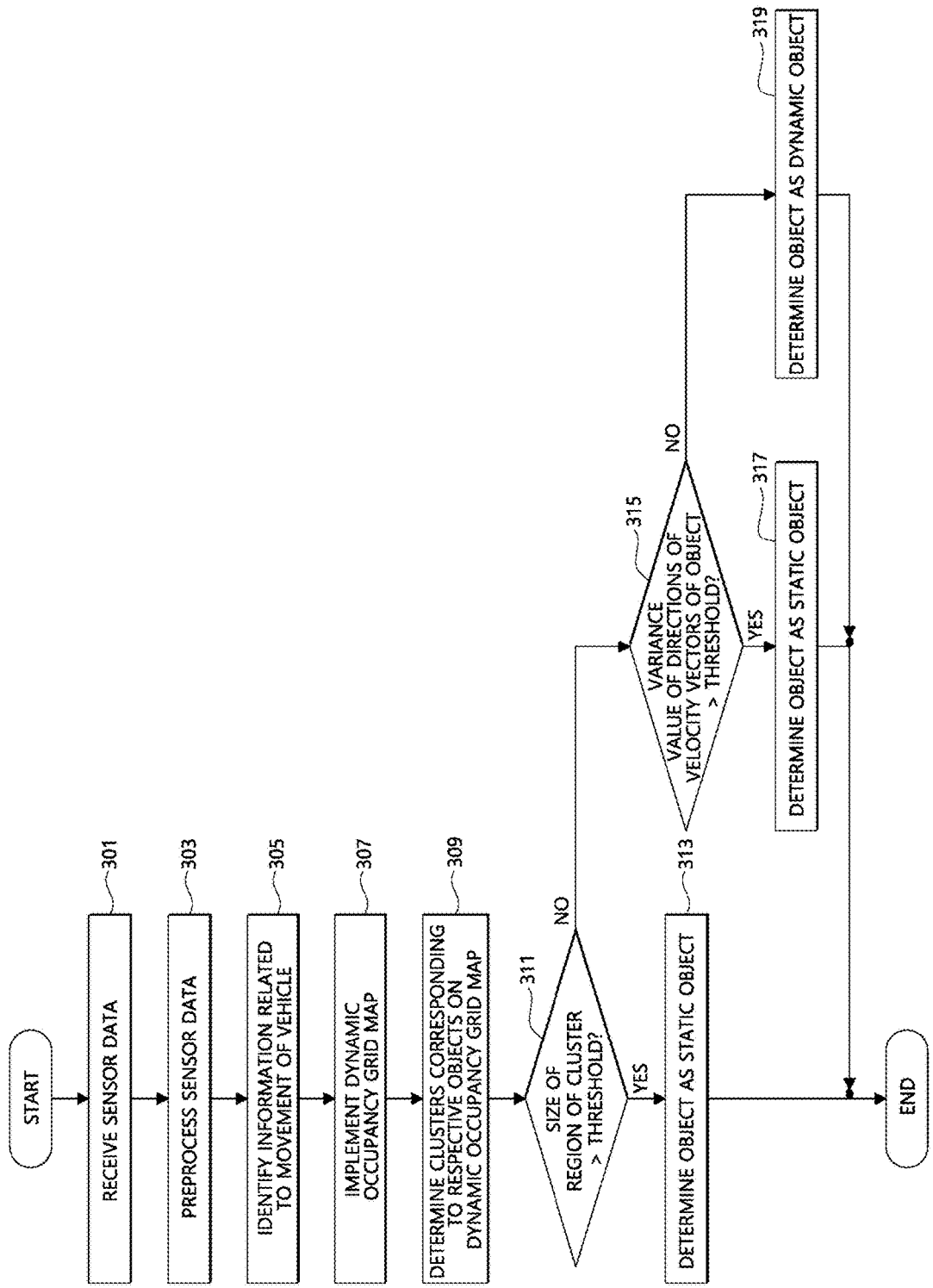
FIG. 3 is a flowchart representing operation of the system according to one embodiment of the present invention.

FIG. 3 is a flowchart representing operation of the system 100 (and/or the controller 106 of the system 100) according to one embodiment of the present invention.

Referring to FIG. 3, the system 100 may receive sensor data (301).

The sensor data may include image data acquired through the camera 12 and/or LiDAR data generated through the LiDAR 14.

For example, the vehicle 1 may acquire image data through the camera 12, may generate LiDAR data through the LiDAR 14, and may transmit the image data and/or the LiDAR data to the system 100. Therefore, the system 100 may receive the image data and/or the LiDAR data.

The system 100 may preprocess the sensor data (303).

Preprocessing of the sensor data may include generation of an occupancy grid map based on the sensor data. The occupancy grid map may include a plurality of grid cells including point data corresponding respectively to a plurality of objects.

For example, the system 100 may generate an occupancy grid map with respect to the surrounding area of the vehicle 1, i.e., an area of interest, based on the received sensor data, i.e., by applying the received sensor data to respective sensor models.

Figure 4:
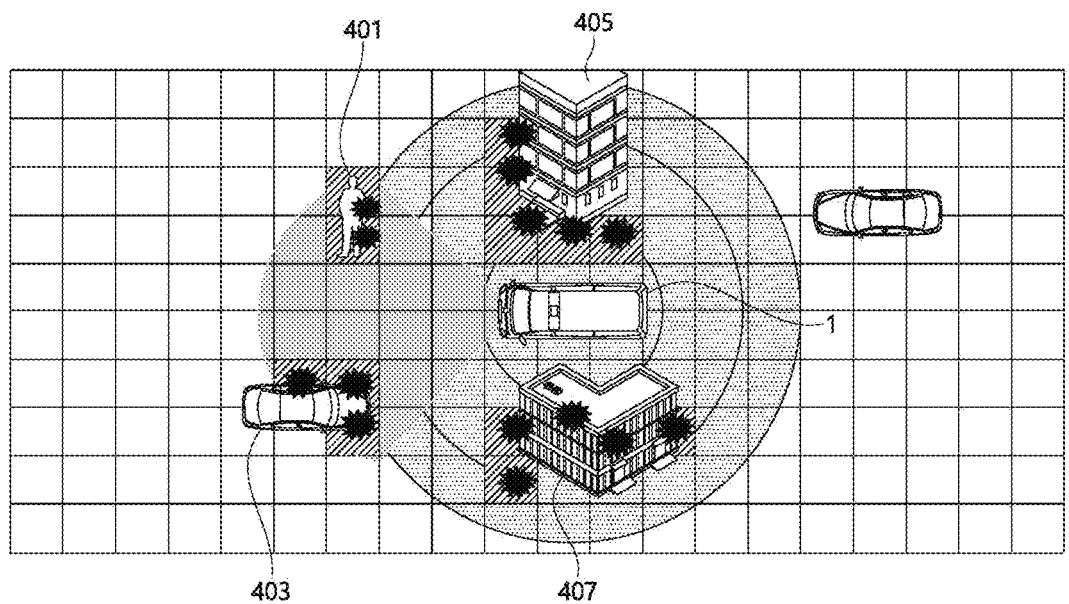
FIG. 4 is a diagram illustrating generation of an occupancy grid map according to one embodiment of the present invention.

FIG. 4 is a diagram illustrating generation of the occupancy grid map according to one embodiment of the present invention.

Referring to FIG. 4, the occupancy grid map may include sensor measuring values, i.e., the point data corresponding respectively to the plurality of objects, and cells in which the occupancy rate of point data is equal to or greater than a predetermined threshold may be determined as effective cells in which objects 401, 403, 405 and 407 around the vehicle 1 are located.

The system 100 may identify information related to movement of the vehicle 1 (305).

The information related to movement of the vehicle 1 may include the velocity of the vehicle 1 and/or the yaw rate of the vehicle 1.

The system 100 may implement a dynamic occupancy grid map of the vehicle 1 based on the information related to movement of the vehicle 1 (307).

The system 100 may calculate velocity vector information of the point data corresponding respectively to the plurality of objects ($X = \{x, y, \dot{x}, \dot{y}\}^T$. X: point data, x: x coordinate, y: y coordinate, $X = \{x, y, \dot{x}, \dot{y}\}^T$: velocity value in x-direction, and $X = \{x, y, \dot{x}, \dot{y}\}^T$: velocity value in y-direction), based on the information related to movement of the vehicle 1.

The velocity vector information of the point data may be calculated based on velocity information acquired based on past and present position information of the point data and elapsed time, and velocity information of the vehicle 1 included in the information related to movement of the vehicle 1.

For example, the system 100 may calculate velocity information of the point data corresponding respectively to the plurality of objects (referred to as first velocity information), i.e., relative velocity information of each of the plurality of objects to the vehicle 1, based on the position information of the point data corresponding respectively to the plurality of objects at a first point in time and position information thereof at a second point in time after the first point in time, as time passes during driving of the vehicle 1.

Further, the system 100 may calculate velocity information of the vehicle 1 between the first point in time and the second point in time (referred to as second velocity information), based on the information related to movement of the vehicle 1.

Further, the system 100 may calculate final velocity information of the point data corresponding respectively to the plurality of objects, i.e., velocity vector information of the point data corresponding respectively to the plurality of objects, by summing the first velocity information and the second velocity information.

The system 100 may generate a dynamic occupancy grid map by mapping the calculated velocity vector information of the point data corresponding respectively to the plurality of objects to the occupancy grid map. Each cell of the dynamic occupancy grid map may include the occupancy probability, the position information and/or the velocity vector information of the point data.

The dynamic occupancy grid map generated according to this embodiment of the present invention may overcome limits of the conventional static occupancy grid map (SOGM) which has generally been used to store environment recognition results for autonomous vehicles.

Figure 5A:
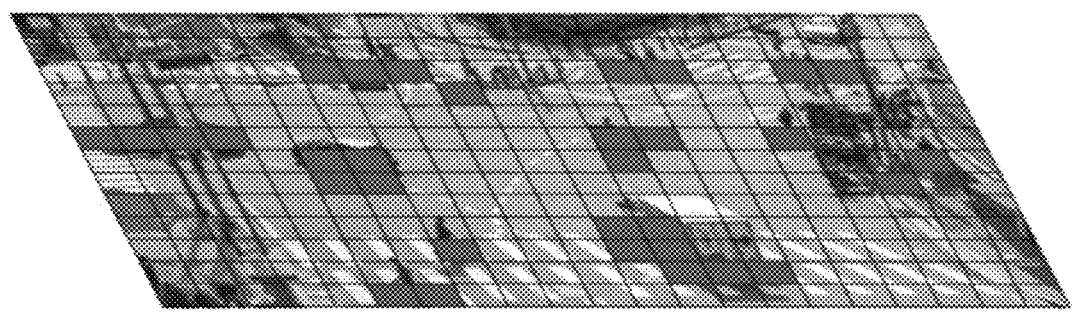
FIGS. 5A and 5B are diagrams showing a conventional static occupancy grid map and a dynamic occupancy grid map according to one embodiment of the present invention.
Figure 5B:
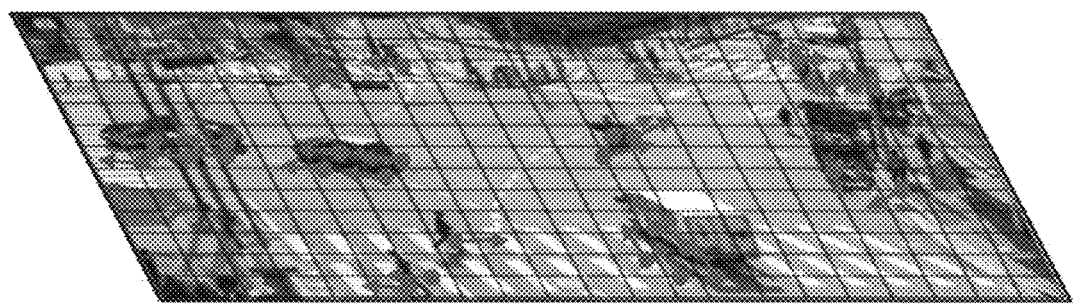

FIGS. 5A and 5B are diagrams showing the conventional static occupancy grid map and the dynamic occupancy grid map according to one embodiment of the present invention.

Referring to FIGS. 5A and 5B, the conventional static occupancy grid map has been implemented such that the position information of dynamic objects and static objects are expressed in a static state, as shown in FIG. 5A. Therefore, the conventional static occupancy grid map is limited in expression of the dynamic objects so as to be distinguished from the static objects.

On the other hand, the dynamic occupancy grid map of the vehicle 1 generated according to one embodiment of the present invention may represent the positions and the velocities of objects regardless of kinds of the objects, as shown in FIG. 5B. That is, the dynamic occupancy grid map may include velocity vector information (including direction and velocity information) of point data corresponding to the respective objects.

Therefore, the system 100 according to one embodiment of the present invention may estimate recognition information, necessary for autonomous driving, of dynamic objects, advance information of which is not known, in a crowded downtown situation.

The system 100 may perform object clustering on the dynamic occupancy grid map, i.e., may determine clusters corresponding to the respective objects on the dynamic occupancy grid map, using the clustering technique (309).

Figure 6A:
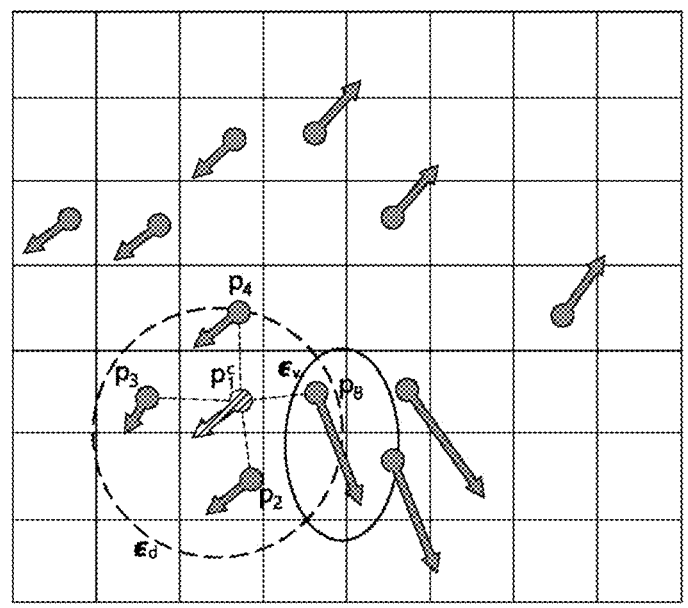
FIGS. 6A to 6C are diagrams illustrating object clustering on the dynamic occupancy grid map according to one embodiment of the present invention.
Figure 6B:
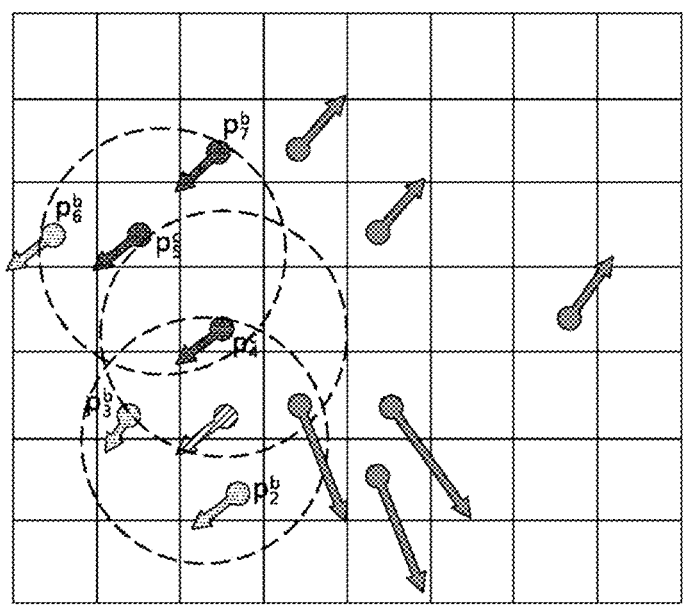
Figure 6C:
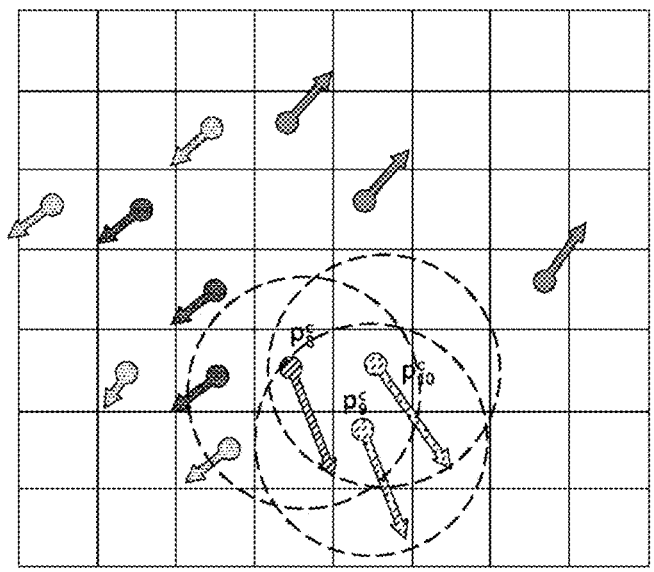
Figure 7:
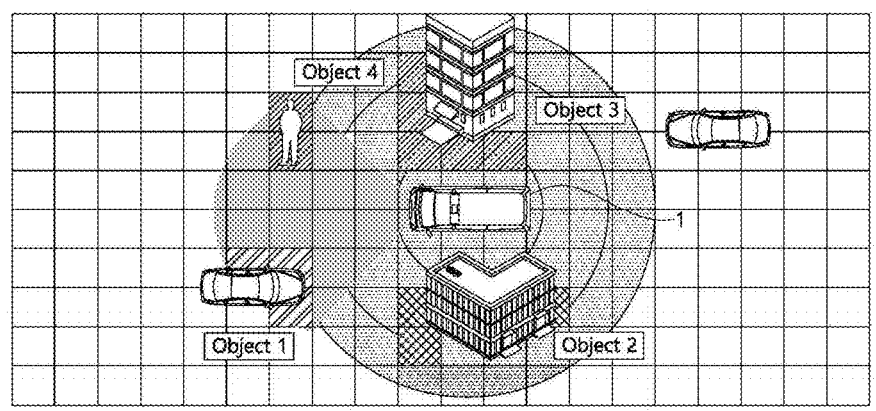
FIG. 7 is a diagram showing clusters corresponding respectively to a plurality of objects on the dynamic occupancy grid map according to one embodiment of the present invention.

The system 100 may determine clusters corresponding respectively to a plurality of objects, as shown in FIG. 7, by performing object clustering on the dynamic occupancy grid map using the DBSCAN algorithm, as shown in FIGS. 6A to 6C.

FIGS. 6A to 6C are diagrams illustrating object clustering on the dynamic occupancy grid map according to one embodiment of the present invention, and FIG. 7 is a diagram showing clusters corresponding respectively to a plurality of objects on the dynamic occupancy grid map according to one embodiment of the present invention.

Referring to FIG. 6A, the system 100 may determine a core point p1. For example, the system 100 may determine an arbitrary point configured such that there are at least M points (M being a predetermined number) in its surrounding area with a predetermined radius R on the dynamic occupancy grid map, as the core point p1.

Further, the system 100 may compare the speed of point data located within a predetermined range εd from the core point p1, with the speed of the core point p1.

The system 100 may include point data having a speed difference with the core point p1 which is less than a predetermined threshold cv in the same cluster as the core point p1, and may exclude point data having a speed difference with the core point p1 which is not less than the predetermined threshold cu from the same cluster as the core point p1.

Referring to FIG. 6A, the system 100 may include points p2 to p4 having speed differences with the core point p1 which are less than the predetermined threshold cv in the same cluster as the core point p1, and may exclude a point p8 having a speed difference with the core point p1 which is not less than the predetermined threshold cu from the same cluster as the core point p1.

Further, referring to FIG. 6B, the system may determine points p4 and p5 as core points, may compare the speeds of point data located within predetermined ranges from the core points p4 and p5 with the speeds of the core points p4 and p5, and may include point data having speed differences with the core points p4 and p5 which are less than the predetermined threshold in clusters including the core points p4 and p5.

Further, referring to FIG. 6C, the system 100 may determine point p8 which has not been clustered, as a core point, and may form a new cluster through comparison of speed differences based on the core point p8.

The system 100 may assign object identification information, such as object 1, object 2, object 3 and object 4, to the respective clusters, as shown in FIG. 7.

The system 100 may confirm whether or not the region sizes of the respective clusters are greater than a predetermined threshold (311).

The system 100 may perform Operation 313 when the region size of a cluster is greater than the predetermined threshold, or may perform Operation 315 when the region size of the cluster is not greater than the predetermined threshold.

The system 100 may determine, when the region size of a cluster is greater than the predetermined threshold (referred to as the first threshold), the corresponding object as a static object (313).

For example, the system 100 may determine, when the region size of a cluster is greater than the predetermined threshold, a corresponding object as a static object, such as a building.

The system 100 may confirm, when the region size of a cluster is not greater than the predetermined threshold, whether or not a variance value of the directions of the velocity vectors of a corresponding object is greater than a threshold (referred to as the second threshold) (315).

Figure 8:
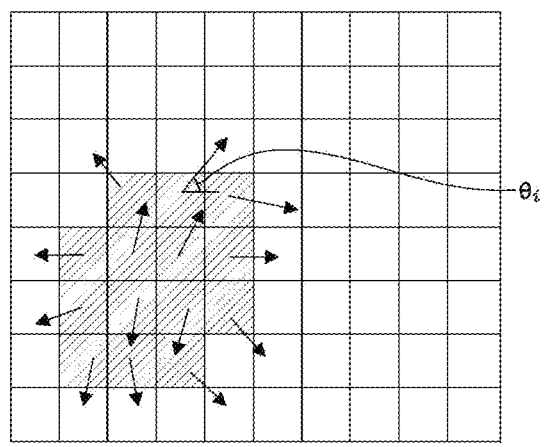
FIG. 8 is a diagram illustrating calculation of a variance value of the directions of the velocity vectors of an object according to one embodiment of the present invention.

FIG. 8 is a diagram illustrating calculation of a variance value of the directions of the velocity vectors of an object according to one embodiment of the present invention.

Referring to FIG. 8, the system 100 may calculate a variance value of an arbitrary function (f) using direction values of the object as input, i.e., the variance value of the directions of the velocity vectors of the object, in consideration of periodicity (0°-360°) of direction values θi of the velocity vectors of respective cells corresponding to the object, as shown in FIG. 8.

For example, the system 100 may calculate the variance value of the directions of the velocity vectors of the object based on the following Equation 1.

$$\text{Var} = \frac{\sum_{i=1}^{n} \{f(\theta_i) - \mu\}^2}{n} \qquad \text{Equation 1}$$

$$\left(\mu = \frac{\sum_{i=1}^{n} f(\theta_i)}{n},\right.$$

f: function (for example, sin( ), cos( ), or the like), n: the number of cells in a cluster.)

Figure 9A:
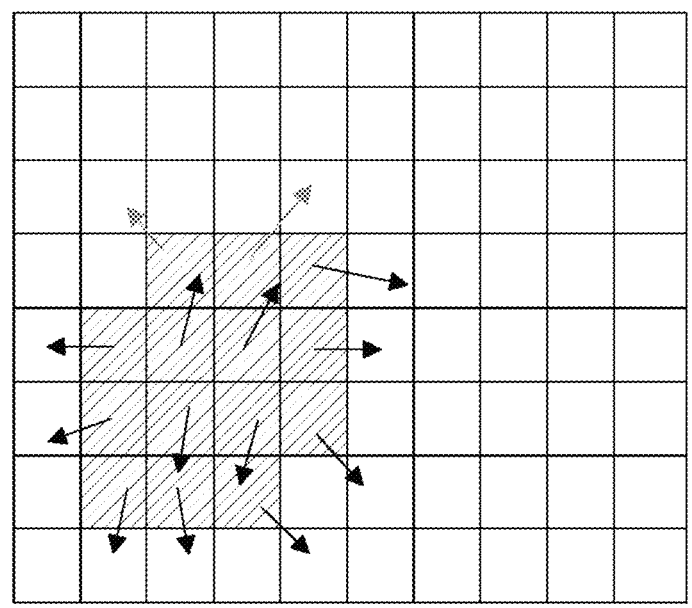
FIGS. 9A and 9B are diagrams illustrating characteristics of the velocity vectors of a cluster including a static object and a cluster including a dynamic object according to one embodiment of the present invention.
Figure 9B:
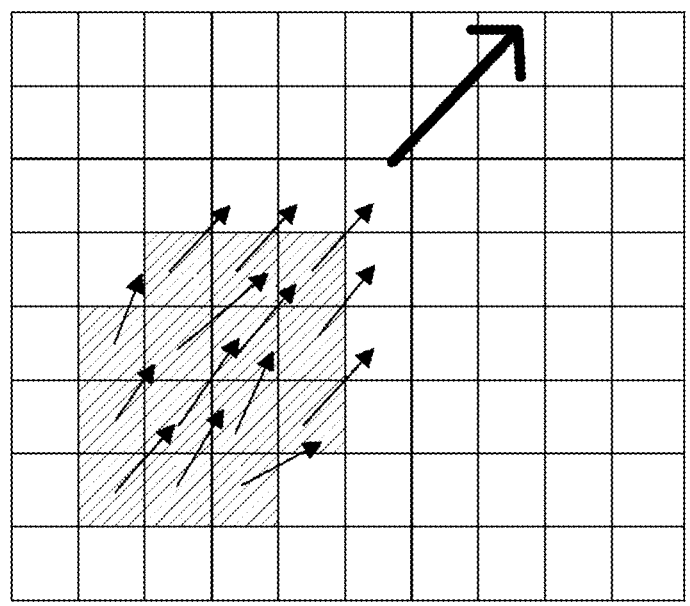

FIGS. 9A and 9B are diagrams illustrating characteristics of the velocity vectors of a cluster including a static object and a cluster including a dynamic object according to one embodiment of the present invention.

Referring to FIGS. 9A and 9B, the velocity vectors of respective cells of the cluster including the static object tend to spread in all directions without converging, as shown in FIG. 9A, but the velocity vectors of respective cells of the cluster including the dynamic object tend to converge in the heading direction of the object, as shown in FIG. 9B.

Thereby, a variance of velocity directions, i.e., a variance value of the velocity vectors, of the cluster including the static object has a relatively large value, and a variance of velocity directions of the cluster including the dynamic object has a relatively small value.

Using the above characteristics, in this embodiment of the present invention, when a variance value of directions of velocity vectors is greater than a predetermined threshold, a corresponding object may be determined as a static object, and, when the variance value of the directions of the velocity vectors is not greater than the predetermined threshold, the corresponding object may be determined as a dynamic object.

The system 100 may determine the object as a static object, when the variance value of the velocity vectors of the corresponding object is greater than the threshold value (317).

The system 100 may determine the object as a dynamic object, when the variance value of the velocity vectors of the corresponding object is equal to or less than the threshold value (319).

One embodiment of classification of objects around the vehicle 1 into static objects and/or dynamic objects by the system 100 according to the above-described embodiments will be described below with reference to FIGS. 10A and 10B.

Figure 10A:
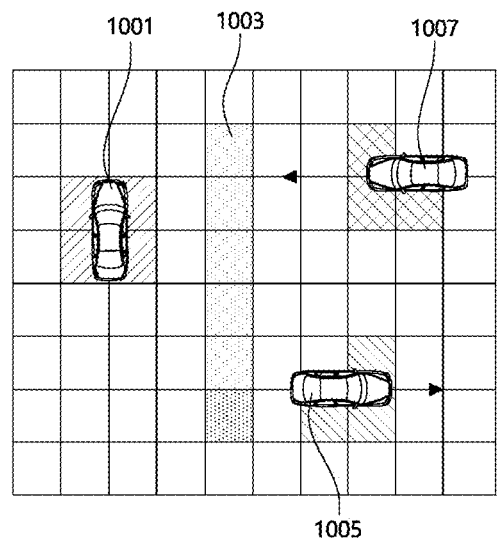
FIGS. 10A and 10B are diagrams illustrating classification of objects around a vehicle according to one embodiment of the present invention.
Figure 10B:
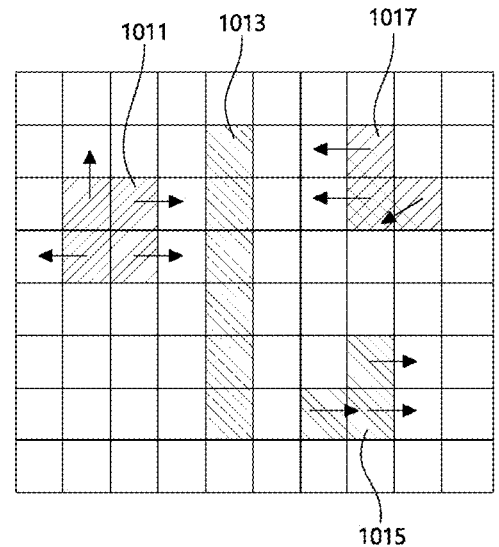

FIGS. 10A and 10B are diagrams illustrating classification of objects around the vehicle 1 according to one embodiment of the present invention.

Referring to FIGS. 10A and 10B, when a static vehicle 1001, a long wall 1003, a dynamic vehicle 1005 and a dynamic vehicle 1007 are located around the vehicle 1, as shown in FIG. 10A, the system 100 may generate a dynamic occupancy grid map, as shown in FIG. 10B, according to the above-described embodiments.

Further, the system 100 may determine clusters corresponding respectively to the static vehicle 1001, the long wall 1003, the dynamic vehicle 1005 and the dynamic vehicle 1007, and may assign object identification information to the respective clusters.

For example, as shown in FIG. 10B, object identification information, i.e., a first object 1011, may be matched to the cluster corresponding to the static vehicle 1001, object identification information, i.e., a second object 1013, may be matched to the cluster corresponding to the long wall 1003, object identification information, i.e., a third object 1015, may be matched to the cluster corresponding to the dynamic vehicle 1005, and object identification information, i.e., a fourth object 1017, may be matched to the cluster corresponding to the dynamic vehicle 1007.

Further, the system 100 may confirm whether or not the region sizes (or the horizontal lengths and/or the vertical lengths of the regions) of the clusters corresponding to the respective objects are greater than a predetermined threshold.

Depending on such a confirmation operation, the system 100 may confirm that the region size of the cluster corresponding to the second object 1013 is greater than the predetermined threshold, and may determine the second object 1013 as a static object, i.e., determine the area of the cluster corresponding to the second object 1013 as the area of a static object.

Further, the system 100 may calculate variance values of directions of velocity vectors included in cells belonging to the respective clusters other than the cluster corresponding to the second object 1013.

For example, the system 100 may calculate the variance values of the directions of the velocity vectors included in the cells belonging to the respective clusters corresponding to the first object 1011, the third object 1015 and the fourth object 1017 as follows.

1) Variance value of directions of velocity vectors included in cells belonging to cluster corresponding to first object 1011
1-1) Average: $(\sin(0)+\sin(0)+\sin(90)+\sin(180))/4=0.25$
1-2) Variance: $((\sin(0)-0.25)^2+(\sin(0)-0.25)^2+((\sin(90)-0.25)^2+(\sin(180)-0.25)^2)/4=0.25$ 2) Variance value of directions of velocity vectors included in cells belonging to cluster corresponding to third object 1015
2-1) Average: $(\sin(0)+\sin(0)+\sin(0))/3=0$
2-2) Variance: $((\sin(0)-0)^2+(\sin(0)-0)^2+((\sin(0)-0)^2)/3=0$ 3) Variance value of directions of velocity vectors included in cells belonging to cluster corresponding to fourth object 1017
3-1) Average: $(\sin(180)+\sin(180)+\sin(210))/3=-0.167$
3-2) Variance: $((\sin(180)+0.167)^2+(\sin(180)+0.167)^2+((\sin(210)+0.167)^2)/3=0.0556$ Further, the system 100 may compare the calculated variance values of the clusters corresponding to the respective objects with a predetermined threshold. Further, the system 100 may determine the object having the variance value which is greater than the predetermined threshold, as a static object, i.e., determine the area of the cluster corresponding to the object having the variance value which is greater than the predetermined threshold, as the area of a static object. On the other hand, the system 100 may determine the object having the variance value which is equal to or less than the predetermined threshold, as a dynamic object, i.e., determine the area of the cluster corresponding to the object having the variance value which is equal to or less than the predetermined threshold, as the area of a dynamic object.

For example, on the assumption that the predetermined threshold is 0.1, the system 100 may confirm that the first object 1011 has a variance value which is greater than the predetermined threshold and the third object 1015 and the fourth object 1017 have variance values which are not greater than the predetermined threshold.

Thereby, the system 100 may determine the first object 1011 as a static object, and may determine the third object 1015 and the fourth object 1017 as dynamic objects.

Through the system 100 for classifying objects around the vehicle 1 according to the above-described embodiment, when the vehicle 1 designs a driving path for autonomous driving, the vehicle 1 predicts the moving paths of only dynamic objects without performing separate path prediction of static objects, thereby being capable of preventing collision with other vehicles. Thereby, unnecessary arithmetic operations taken for the vehicle 1 to predict the paths of the static objects may be reduced.

Figure 11A:
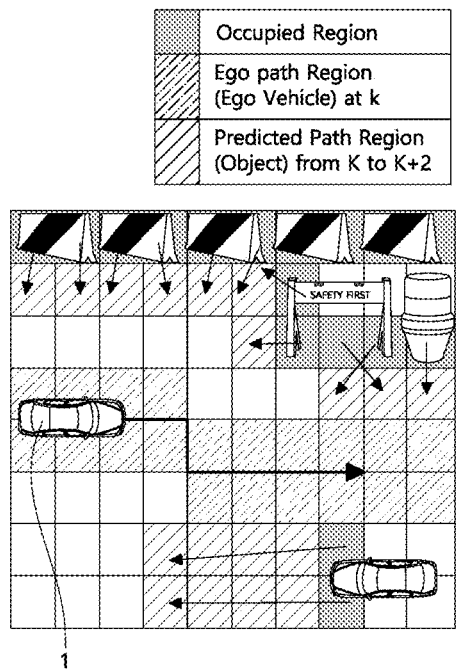
FIGS. 11A and 11B are diagrams illustrating efficiency in control of driving of a vehicle through classification of objects around the vehicle in the state in which temporary obstacles are installed on one side of a road according to one embodiment of the present invention.
Figure 11B:
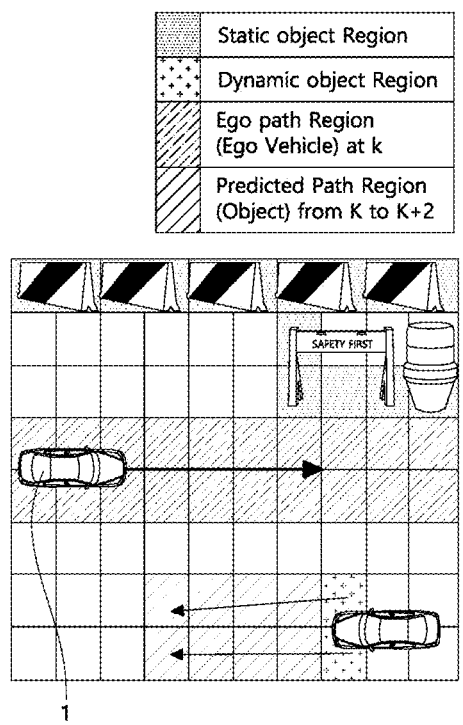

FIGS. 11A and 11B are diagrams illustrating efficiency in control of driving of a vehicle 1 through classification of objects around the vehicle 1 in the state in which temporary obstacles are installed on one side of a road according to one embodiment of the present invention.

Referring to FIG. 11A, a conventional vehicle 1 does not classify objects around the vehicle 1 into static objects and/or dynamic objects, and thereby, designs an unnecessary path to avoid temporary obstacles, i.e., static objects, as shown in FIG. 11A.

On the other hand, referring to FIG. 11b, the vehicle 1 including the system 100 according to one embodiment of the present invention may classify objects around the vehicle 1 into static objects and/or dynamic objects, and thereby, does not require design of an unnecessary path to avoid the temporary obstacles, i.e., static objects, as shown in FIG. 11B, thereby being capable of preventing waste of power taken to predict and set the path.

Figure 12A:
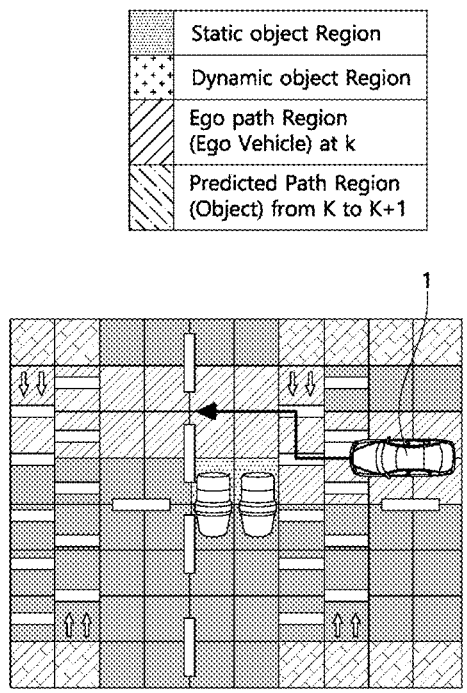
FIGS. 12A and 12B are diagrams illustrating control of driving of a vehicle through classification of objects around the vehicle when obstacles exist at an intersection according to one embodiment of the present invention.
Figure 12B:
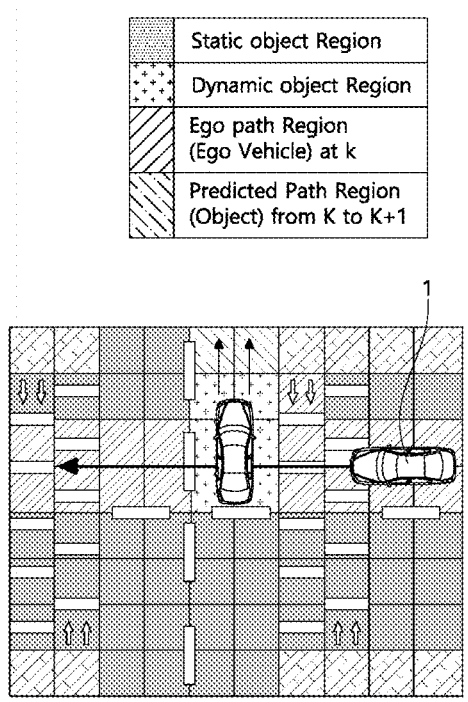

FIGS. 12A and 12B are diagrams illustrating control of driving of a vehicle 1 through classification of objects around the vehicle 1 when obstacles exist at an intersection according to one embodiment of the present invention.

Referring to FIG. 12A, the vehicle 1 including the system 100 may confirm that static objects are located at the intersection, and may set a vehicle path to avoid the static objects, as shown in FIG. 12A.

Further, referring to FIG. 12B, when there is another vehicle, i.e., a dynamic object, crossing the intersection, the vehicle 1 including the system 100 may identify the dynamic object, may predict the future path of the dynamic object, may determine a probability of avoiding collision with the corresponding vehicle, i.e., the dynamic object, and may thus perform collision avoidance control.

The above-described embodiments may be implemented in the form of recording media in which commands executable by computers are stored. The commands may be stored in the form of program code, and may generate program modules and may thus perform operations of the disclosed embodiments when the commands are executed by a processor. The recording media may be implemented as computer readable recording media.

The computer readable recording media may include all kinds of recording media in which commands readable by computers are stored. For example, the computer readable recording media may include a Read Only Memory (ROM), a Random Access Memory (RAM), a magnetic tape, a magnetic disk, a flash memory, an optical data storage device, etc.

As is apparent from the above description, a method and system for classifying objects around a vehicle according to embodiments of the present invention may effectively classify the objects around the vehicle into static objects and/or dynamic objects.

Therefore, the method and system according to embodiments of the present invention may allow the vehicle to predict the moving paths of only dynamic objects without performing separate path prediction of static objects, when the vehicle designs a driving path for autonomous driving, thereby being capable of preventing the vehicle from colliding with the dynamic objects, i.e., other vehicles, around the vehicle.

Further, the method and system according to embodiments of the present invention may reduce unnecessary arithmetic operations taken for the vehicle to predict the paths of the static objects.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for classifying objects around a vehicle, the method comprising:
generating a dynamic occupancy grid map comprising a plurality of cells comprising point data corresponding to each of a plurality of objects located around the vehicle and velocity vector information of the point data, based on LiDAR data received from a LiDAR sensor of the vehicle and information related to movement of the vehicle;
determining a cluster corresponding to each of the plurality of objects on the dynamic occupancy grid map using a clustering technique; and
classifying an object corresponding to the cluster into a static object or a dynamic object, based on a region size of the cluster and velocity vector information included in cells belonging to the cluster.

2. The method according to claim 1, wherein generating the dynamic occupancy grid map comprises:
generating an occupancy grid map comprising a plurality of grid cells comprising the point data corresponding to each of the plurality of objects, based on the LiDAR data; and
generating the dynamic occupancy grid map by mapping the velocity vector information of the point data calculated based on the information related to the movement of the vehicle to the occupancy grid map.

3. The method according to claim 2, wherein the velocity vector information is calculated based on velocity information acquired based on past and present position information of the point data and elapsed time and velocity information of the vehicle included in the information related to the movement of the vehicle.

4. The method according to claim 1, further comprising assigning object identification information to the cluster corresponding to each of the plurality of objects.

5. The method according to claim 1, wherein classifying the object corresponding to the cluster into the static object or the dynamic object comprises:
determining, among the objects, a first object as the static object based on a region size of the cluster corresponding to the first object being greater than a first predetermined threshold; and
determining, among the objects, a second object as the static object or the dynamic object based on a region size of the cluster corresponding to the second object being equal to or less than the first predetermined threshold and based on velocity vector information included in cells corresponding to the second object.

6. The method according to claim 5, wherein determining the second object as the static object or the dynamic object comprises:
identifying whether or not a variance value of directions of velocity vectors is greater than a second predetermined threshold based on the velocity vector information included in the cells corresponding to the second object;
determining the second object as the static object when the variance value is greater than the second predetermined threshold; and
determining the second object as the dynamic object when the variance value is equal to or less than the second predetermined threshold.

7. The method according to claim 1, wherein determining the cluster corresponding to each of the plurality of objects on the dynamic occupancy grid map comprises determining, among respective point data within a predetermined range from arbitrary point data in the plurality of cells, second point data having a speed difference with arbitrary first point data that is equal to or less than a predetermined threshold, as one cluster based on the velocity vector information.

8. A system for classifying objects around a vehicle, the system comprising:
an interface configured to receive LiDAR data from a LiDAR sensor of the vehicle; and
a controller electrically connected to the interface, wherein the controller is configured to:
generate a dynamic occupancy grid map comprising a plurality of cells comprising point data corresponding to each of a plurality of objects located around the vehicle and velocity vector information of the point data, based on the LiDAR data and information related to movement of the vehicle;
determine a cluster corresponding to each of the plurality of objects on the dynamic occupancy grid map using a clustering technique; and
classify an object corresponding to the cluster into a static object or a dynamic object, based on a region size of the cluster and velocity vector information included in cells belonging to the cluster.

9. The system according to claim 8, wherein the controller is configured to:
generate an occupancy grid map comprising a plurality of grid cells comprising the point data corresponding to each of the plurality of objects, based on the LiDAR data; and
generate the dynamic occupancy grid map by mapping the velocity vector information of the point data calculated based on the information related to the movement of the vehicle to the occupancy grid map.

10. The system according to claim 9, wherein the velocity vector information is calculated based on velocity information acquired based on past and present position information of the point data and elapsed time and velocity information of the vehicle included in the information related to the movement of the vehicle.

11. The system according to claim 8, wherein the controller is configured to assign object identification information to the cluster corresponding to each of the plurality of objects.

12. The system according to claim 8, wherein the controller is configured to:
determine, among the objects, a first object as the static object based on a region size of the cluster corresponding to the first object being greater than a first predetermined threshold; and
determine, among the objects, a second object as the static object or the dynamic object based on a region size of the cluster corresponding to the second object being equal to or less than the first predetermined threshold and based on velocity vector information included in cells corresponding to the second object.

13. The system according to claim 12, wherein the controller is configured to:
identify whether or not a variance value of directions of velocity vectors is greater than a second predetermined threshold based on the velocity vector information included in the cells corresponding to the second object;
determine the second object as the static object when the variance value is greater than the second predetermined threshold; and
determine the second object as the dynamic object when the variance value is equal to or less than the second predetermined threshold.

14. The system according to claim 8, wherein the controller is configured to determine the cluster corresponding to each of the plurality of objects on the dynamic occupancy grid map by determining, among respective point data within a predetermined range from arbitrary point data in the plurality of cells, second point data having a speed difference with arbitrary first point data that is equal to or less than a predetermined threshold, as one cluster based on the velocity vector information.

15. A vehicle comprising:
a vehicle body;
a sensor unit connected to the vehicle body, the sensor unit comprising a camera and a LiDAR sensor;
an interface configured to receive data from the sensor unit;
a memory storing data; and
a controller electrically connected to the interface and the memory, wherein the controller is configured to:
generate a dynamic occupancy grid map comprising a plurality of cells comprising point data corresponding to each of a plurality of objects located around the vehicle and velocity vector information of the point data, based on the data and information related to movement of the vehicle;
determine a cluster corresponding to each of the plurality of objects on the dynamic occupancy grid map using a clustering technique; and
classify an object corresponding to the cluster into a static object or a dynamic object, based on a region size of the cluster and velocity vector information included in cells belonging to the cluster.

16. The vehicle according to claim 15, wherein the controller is configured to:
generate an occupancy grid map comprising a plurality of grid cells comprising the point data corresponding to each of the plurality of objects, based on the data; and
generate the dynamic occupancy grid map by mapping the velocity vector information of the point data calculated based on the information related to the movement of the vehicle to the occupancy grid map.

17. The vehicle according to claim 16, wherein the velocity vector information is calculated based on velocity information acquired based on past and present position information of the point data and elapsed time and velocity information of the vehicle included in the information related to the movement of the vehicle.

18. The vehicle according to claim 15, wherein the controller is configured to assign object identification information to the cluster corresponding to each of the plurality of objects.

19. The vehicle according to claim 15, wherein the controller is configured to:
determine, among the objects, a first object as the static object based on a region size of the cluster corresponding to the first object being greater than a first predetermined threshold;
determine, among the objects, a second object as the static object or the dynamic object based on a region size of the cluster corresponding to the second object being equal to or less than the first predetermined threshold and based on velocity vector information included in cells corresponding to the second object;

identify whether or not a variance value of directions of velocity vectors is greater than a second predetermined threshold based on the velocity vector information included in the cells corresponding to the second object;

determine the second object as the static object when the variance value is greater than the second predetermined threshold; and determine the second object as the dynamic object when the variance value is equal to or less than the second predetermined threshold.

20. The vehicle according to claim 15, wherein the controller is configured to determine the cluster corresponding to each of the plurality of objects on the dynamic occupancy grid map by determining, among respective point data within a predetermined range from arbitrary point data in the plurality of cells, second point data having a speed difference with arbitrary first point data that is equal to or less than a predetermined threshold, as one cluster based on the velocity vector information.

* * * * *

UNITED STATES PATENT AND TRADEMARK OFFICE
CERTIFICATE OF CORRECTION

PATENT NO. : 12,292,509 B2  
APPLICATION NO. : 17/872113  
DATED : May 6, 2025  
INVENTOR(S) : Heo et al.

Page 1 of 1

It is certified that error appears in the above-identified patent and that said Letters Patent is hereby corrected as shown below:

On the Title Page

Item (71), in Column 1, in "Applicants", Line 3, delete "Univeristy" and insert -- University --.

Signed and Sealed this  
Twenty-fourth Day of June, 2025

Coke Morgan Stewart  
*Acting Director of the United States Patent and Trademark Office*